Patented Aug. 30, 1932

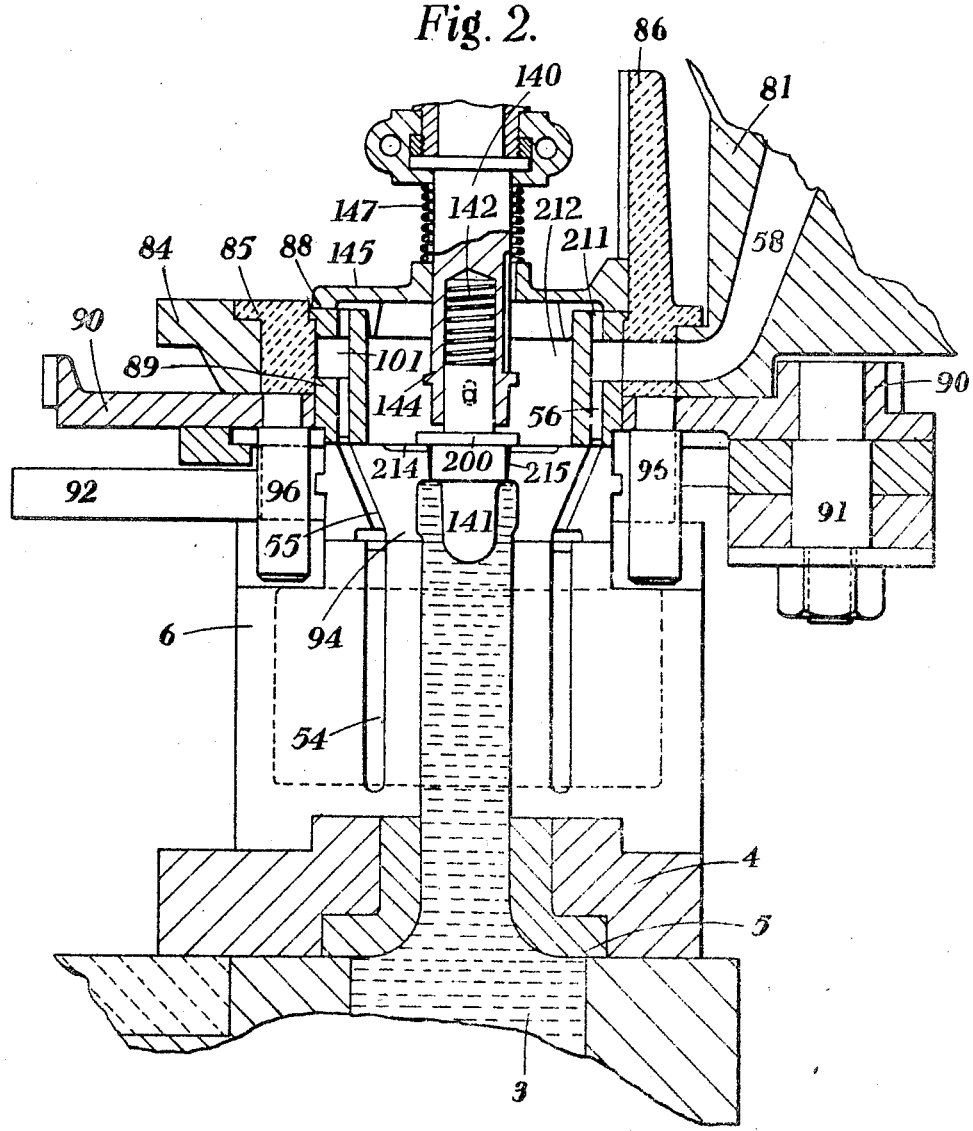

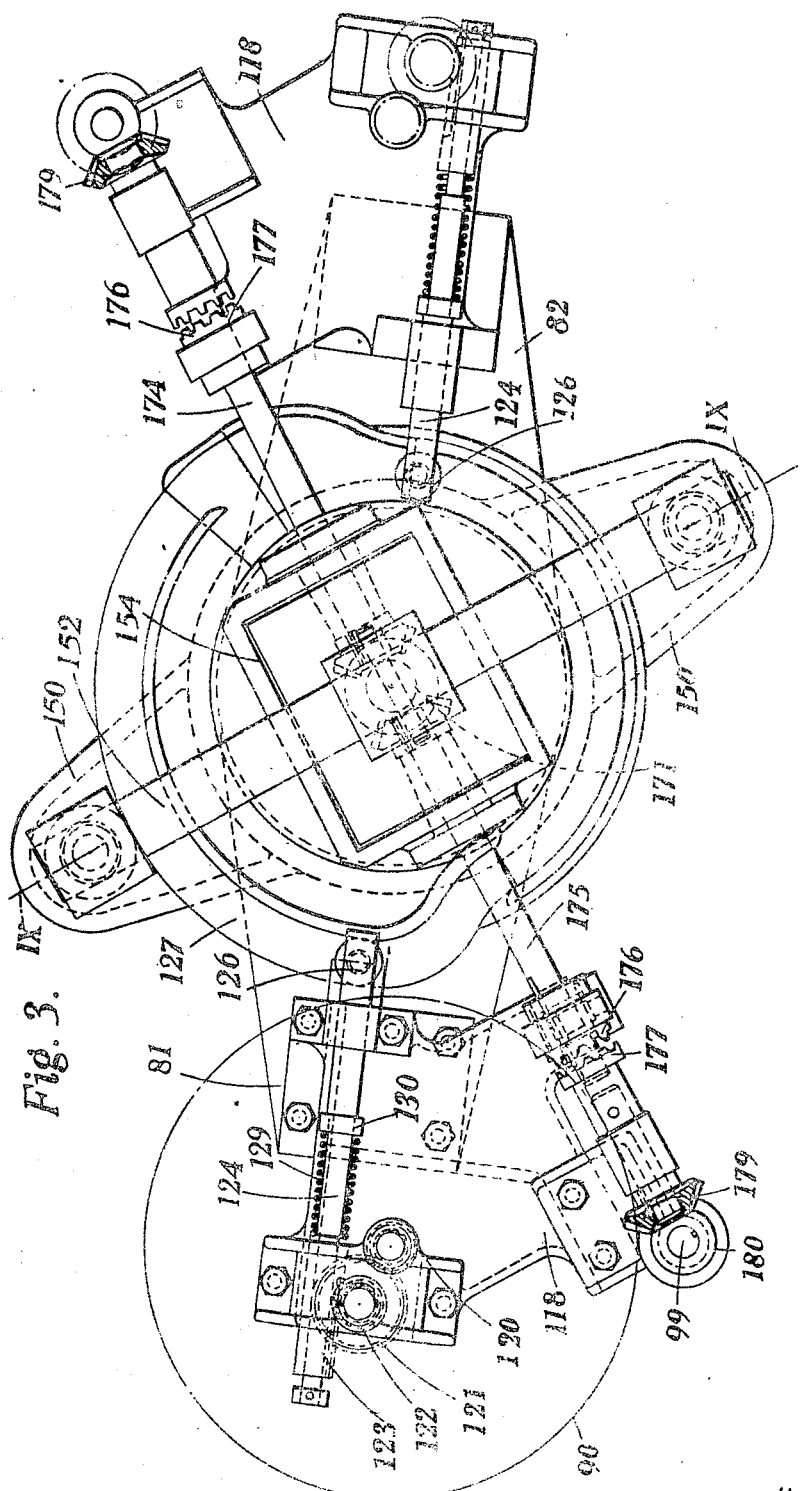

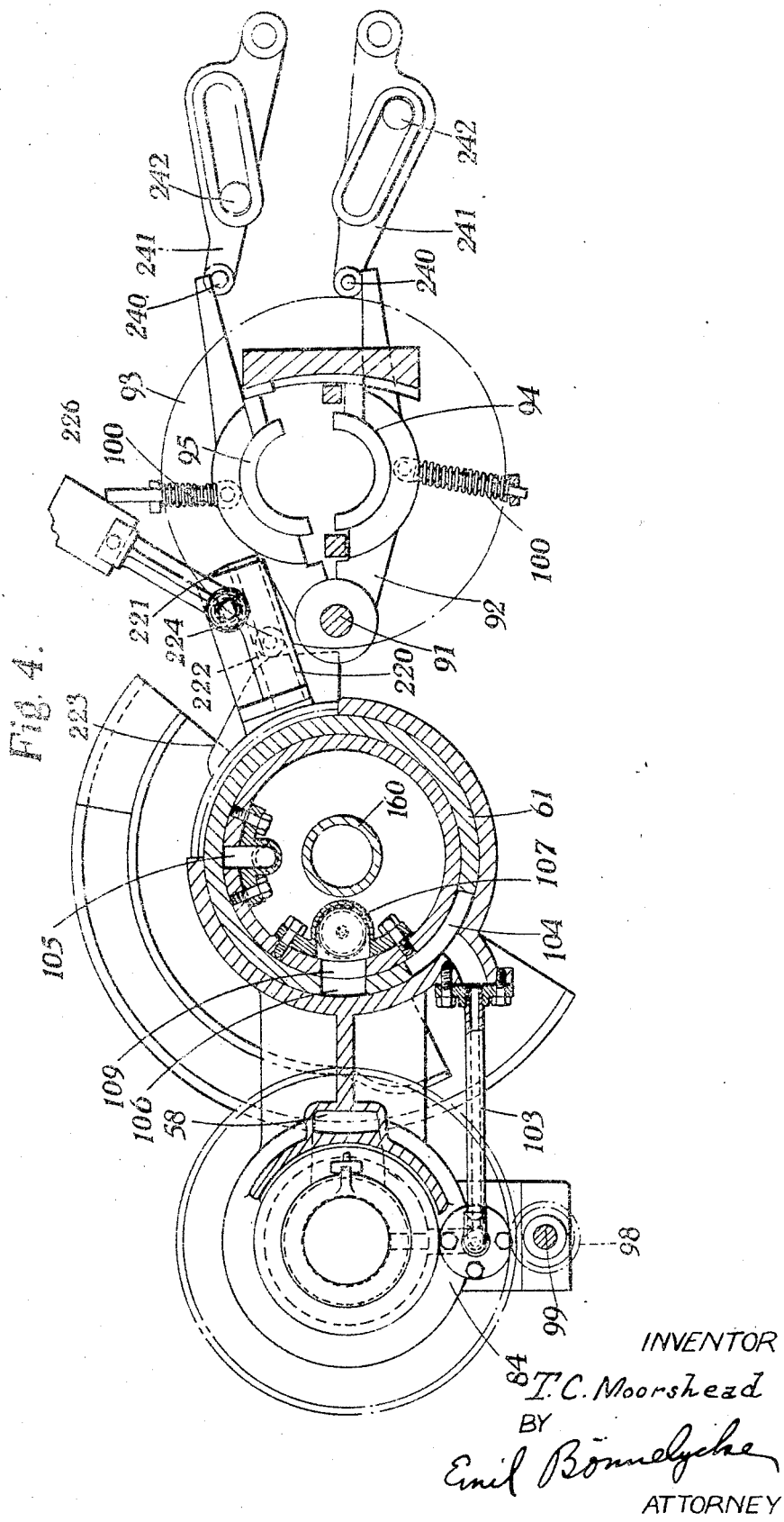

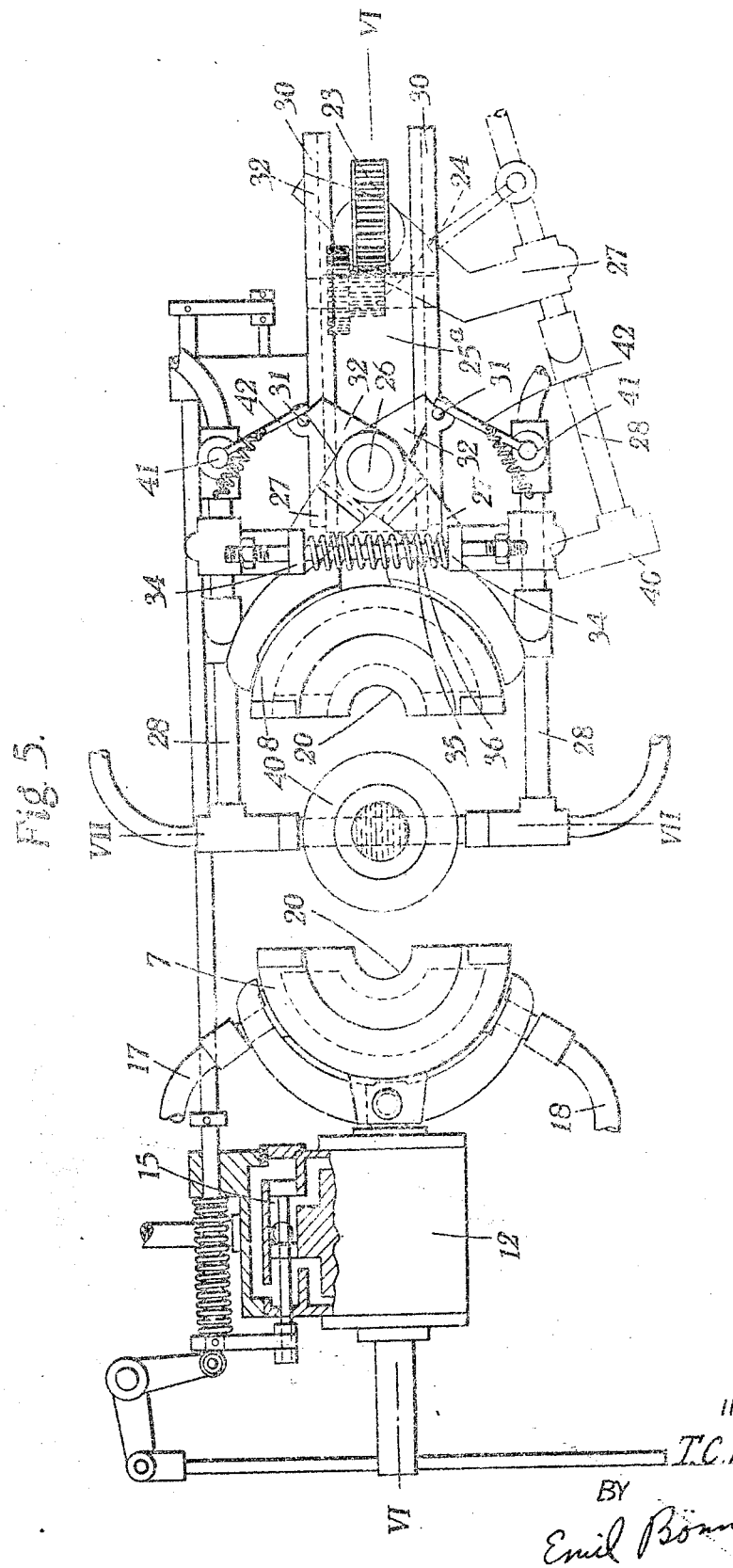

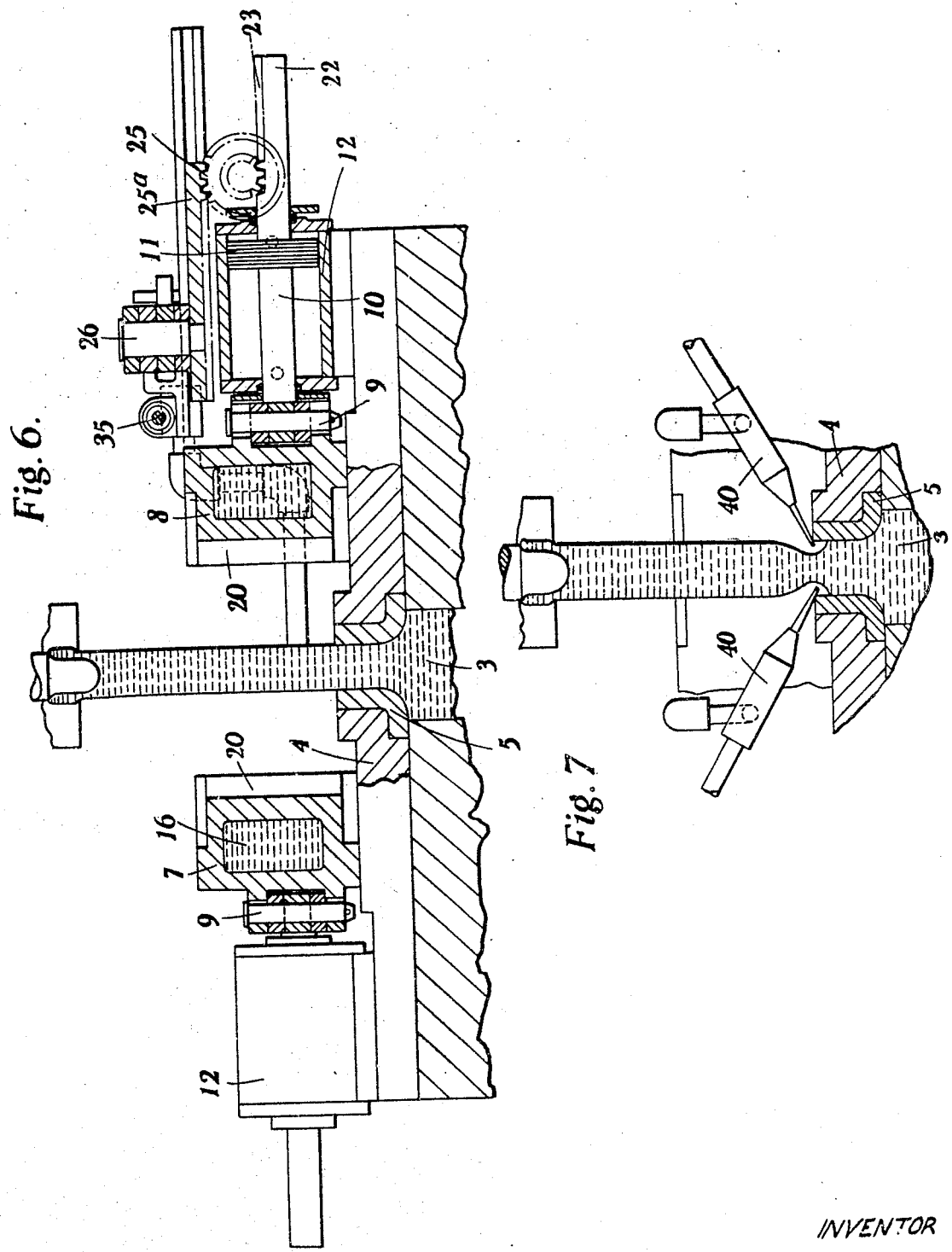

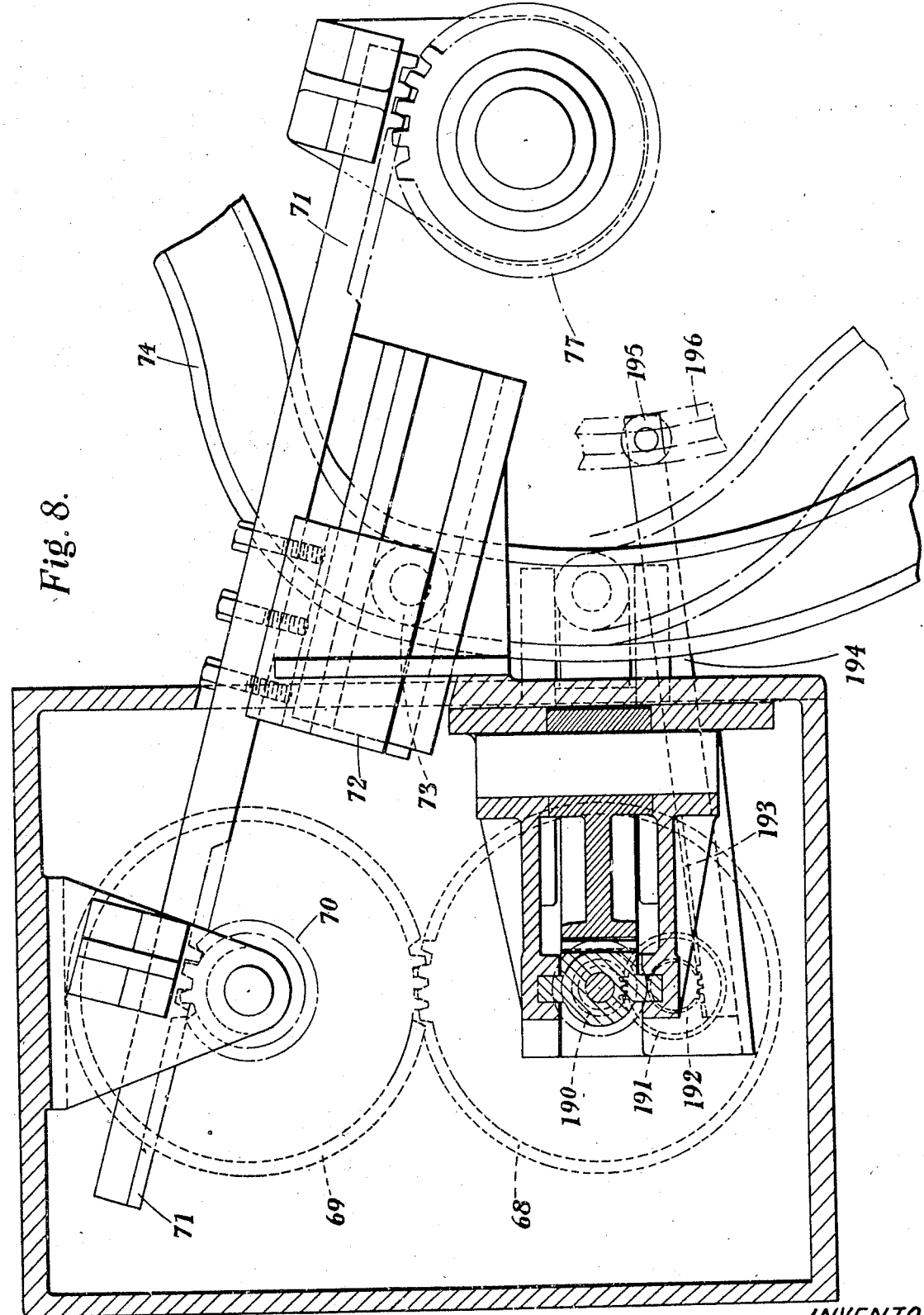

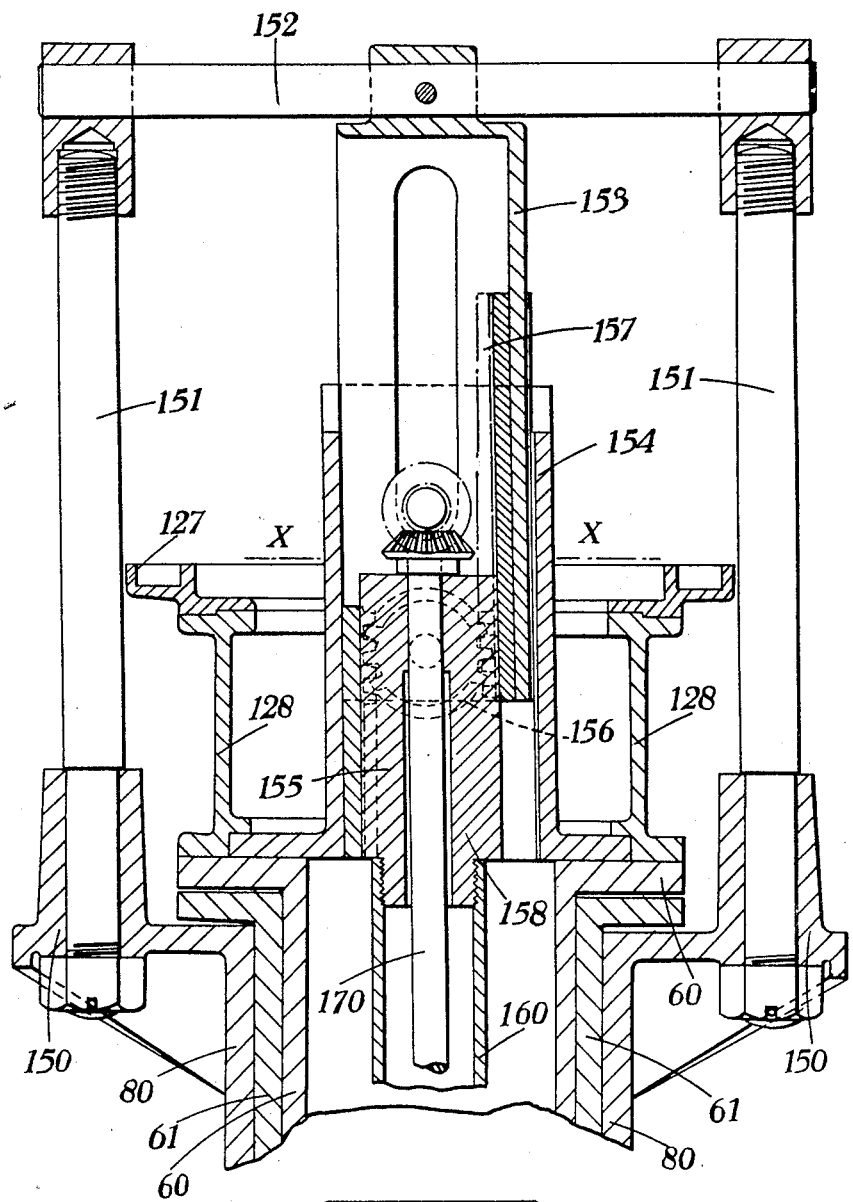
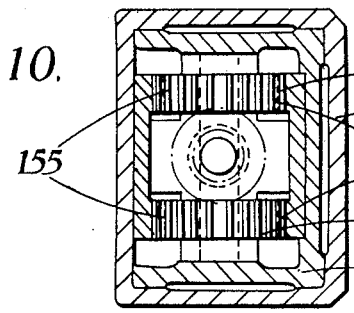

1,875,099

UNITED STATES PATENT OFFICE

THOMAS COURTNEY MOORSHEAD, OF LONDON, ENGLAND, ASSIGNOR TO THE UNITED GLASS BOTTLE MANUFACTURERS, LIMITED, OF STRAND, ENGLAND, A BRITISH COMPANY

MANUFACTURE OF GLASS BOTTLES AND SIMILAR ARTICLES

Application filed January 23, 1931, Serial No. 510,827, and in Great Britain February 20, 1930.

This invention relates to the manufacture of glass bottles and similar articles, and has for its chief object the provision of an improved method of, and apparatus for supplying or feeding glass from a furnace to a glass blowing or moulding machine.

A further object of the invention is the provision of means which will enable the blank or parison moulds in which gobs of glass are usually shaped before delivery to a finishing mould to be dispensed with.

According to one feature of the invention the glass is caused to flow upwardly out of an outlet orifice of a glass furnace, or an extension thereof, so that a column of constantly increasing length is produced, said column when it is of the desired length being detached and shaped or blown in a suitable moulding apparatus. The outlet orifice may be situated below the level of the glass in the furnace so that a constant pressure is exerted by the head of glass in the furnace or forehearth to force the molten glass out of the orifice in an upward direction, the exuded glass being suitably supported and when the desired quantity has been exuded, the column may be detached and transferred to a glass blowing or moulding apparatus. The upper end of the columns may be supported and raised at the same speed that the glass is extruded, and it is preferred that the glass be extruded into a neck mould which is then raised at the speed of extrusion so that the neck mould serves to support, or to assist in the support of, the constantly increasing length of the column of glass. The apparatus is preferably so arranged that the glass is continuously extruded and gobs of the required size from time to time detached therefrom. In order to assist the detachment the column of glass may be heated adjacent its lower end, and the gob may then be rotated and moved away from the orifice. The neck mould or moulds are preferably carried by a rotatably mounted framework located between the forehearth and the finishing or moulding machine so that each neck mould can, at one time, be disposed above and co-operate with the outlet orifice and, at another time, by rotation of the framework, can be positioned above one of a series of finishing moulds mounted upon the mould table of a finishing or blowing machine, suitable means being provided for enabling the neck mould carrier to be raised and lowered and means also being provided for enabling the neck moulds to be rotated about their own axes. The neck mould carrier may also be provided with a plurality of vertically movable plungers adapted to co-operate with the neck moulds in the formation of the upper ends of the extruded columns of glass.

In order that the said invention may be clearly understood and readily carried into effect the same will now be described with reference to the accompanying drawings which illustrate, by way of example, one convenient mode of carrying the invention into effect and in which:—

Fig. 2 is a fragmentary sectional view showing one of the neck moulds in co-operative relation with an extrusion head mounted on the outlet orifice of the furnace;

Fig. 3 is a plan view of the machine shown in Fig. 1, showing details of the plunger raising and lowering means and the means for rotating the neck moulds about their own axes;

Fig. 4 is a sectional plan view taken on the line IV—IV of Fig. 1 showing further details of the means for rotating the neck moulds and the formaiton of the neck mould arms;

Fig. 5 is a plan view taken on the line V—V of Fig. 1 showing further details of the extrusion head and the gas jets, and the means for operating same.

Fig. 6 is a sectional elevation taken on the line VI—VI of Fig. 5.

Fig. 7 is a sectional elevation taken on the line VII—VII of Fig. 5 showing the gas jets in their operative position.

Fig. 8 is a sectional plan view taken on the line VIII—VIII of Fig. 1 showing details of the means for rotating the neck mould carrier about its axis.

Fig. 9 is a vertical sectional elevation taken on the line IX—IX of Fig. 3 showing details of the neck mould carrier raising and lowering means; and Fig. 10 is a sectional plan view taken on the line X—X of Fig. 9.

Figure 1:
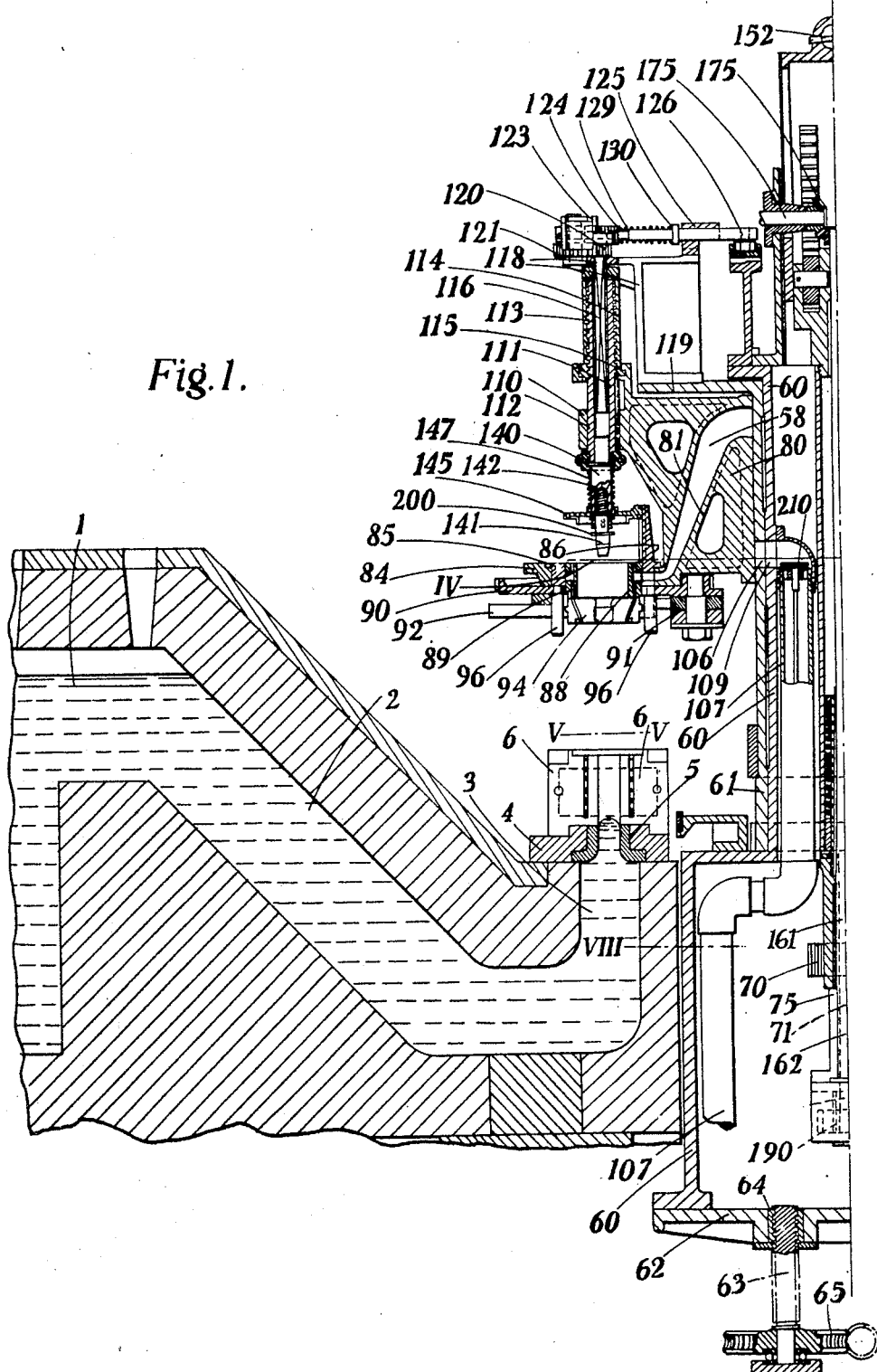
Fig. 1 is a vertical sectional elevation of a machine equipped with two neck moulds or heads, the left hand one being shown disposed above the outlet orifice of the furnace, and the right hand one being shown disposed above a finishing mould to which the suspended gob is about to be delivered.
Figure 1:
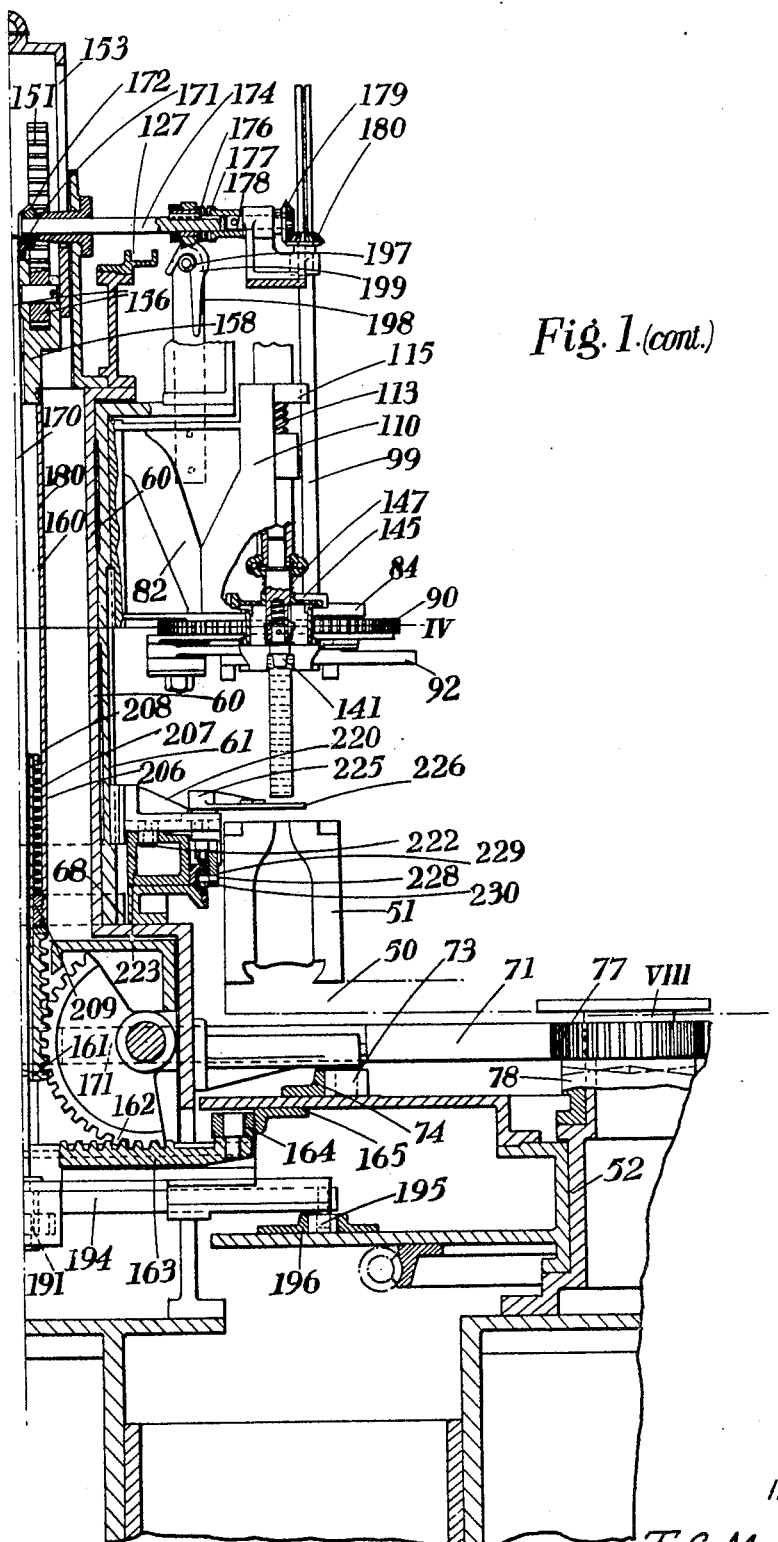

Referring now to Fig. 1 of the drawings in detail, 1 is the forehearth of the furnace, which forehearth is built into the front wall of furnace so that it merges into a passage 2 which is inclined downwardly and then extends upwards to an outlet orifice 3, located at a suitable distance, for instance, about 12 inches, below the level of the glass in the furnace. There is thus a constant head of glass tending to force the molten glass continuously out of the orifice in an upward direction. The flow of glass through the passage 2 may be controlled by a vertically movable plug or other suitable means. Clamped over the outlet orifice 3 by an iron collar 4 is a bushing 5 of refractory material and immediately above this is an extrusion head or water cooled cup 6. The extrusion head is preferably made in halves so that, at the appropriate time, the two halves can be separated and moved away from one another.

For the details of the extrusion head reference is directed to Figs. 5 and 6 which show the two semi-circular parts 7 and 8 in their separated position. The parts 7 and 8 may be moved towards and away from one another by pneumatically operable or other suitable means. As illustrated, each part is connected by a pin 9 to a piston rod 10 having a piston 11 working in a horizontally disposed cylinder 12, the cylinders being arranged diametrically opposite one another on opposite sides of the outlet orifice and a suitable valve controlled arrangement indicated at 15 being provided for controlling the admission and exhaust of compressed air to and from the cylinders. The control valves are preferably operated through suitable mechanism from cam discs situated under the mould table of the finishing or blowing machine hereinafter referred to. The parts 7 and 8 are each provided with a chamber 16 and communicating pipes 17 and 18 through which water can be circulated for cooling purposes, and with vertical semi-circular cavities 20 which in the closed position of the head register with one another to form an upward extension of outlet orifice.

Associated with the outlet orifice there is also preferably provided a pair of gas jets which are adapted to be brought into close proximity with the lower end of the extruded column of glass when the two halves of the extrusion head are separated. For this purpose, one of the piston rods 10 is provided with an extension 22 formed with rack teeth 23 engaging a pinion 24 which is mounted in a suitable stationary part and is adapted to cause reciprocating movements to be imparted to another rack 25 formed on the under surface of a slide 25a provided with an upstanding pin 26 on which are pivotally mounted a pair of arms 27 each carrying at its outer end a gas pipe 28. The slide 25a is mounted so that it can slide between a pair of fixed guides 30 and each of these guides is provided with a cam pin 31 adapted to co-operate with extension pieces 32 formed on the rear ends of the arms 27. Adjacent their opposite ends the arms 27 are each formed with an upstanding lug 34 and carried by a rod 35 extending between these lugs, there is arranged a spring 36 which tends to force the arms 27 apart so that one occupies the dotted line position shown in Fig. 5, and the other a corresponding position on the opposite side of the slide. By this arrangement when the extrusion head is closed the slide 25a which moves in the opposite direction to the piston 11, occupies its extreme right hand position, and when the two parts of the head are moved from the closed to the open position shown in Figs. 5 and 6 the extension pieces 32 towards the end of the stroke of the slide 25a, are brought into contact with the cam pins 31 with the result that the arms 27 and the gas pipes 28 are moved inwardly until they occupy the full line position shown in Fig. 5 with the gas jets 40 which are mounted upon the ends of the pipes 28, in close proximity with the lower end of the extruded column of glass as is shown more clearly in Fig. 7. The gas pipes 28 may also each be provided with a valve 41, the said valves being provided with spring controlled levers 42 arranged so that the ends thereof are towards the end of the stroke of the slide 25a, brought into contact with the cam pins 31 and the gas automatically turned on as the jets approach their operative positions. The ends of the gas jets or nozzles are preferably of flattened formation as may be seen from a comparison of Figs. 5 and 7.

Stationed a short distance from the forehearth is a glass blowing or finishing machine of any suitable construction comprising, for instance, a rotatable table carrying a plurality of finishing moulds and means for blowing the gobs into bottles or similar articles. In the arrangement illustrated in Fig. 1 a portion of the mould table is indicated at 50 and one of the moulds at 51. 52 is a stationary column about which the mould table is adapted to rotate and any suitable known means maybe employed for imparting an intermittent rotary movement to the mould table.

Located between the forehearth and the finishing machine is an apparatus having means for co-operating with the extrustion head 6 to form the gobs or columns of glass and for transferring them to the moulds of the finishing machine. In the arrangement illustrated the apparatus comprises a normally stationary vertical column 60 having a sleeve 61 rotatably mounted thereon. The column is mounted upon a suitable baseplate 62 which can be raised or lowered through the medium of a plurality of jack screws 63, nuts 64 and worm gears 65 either by hand or from a convenient source of power, for adjustment purposes. The sleeve 61 is provided with means for imparting intermittent rotary movements thereto, such movements being conveniently derived from the finishing machine. For this purpose, the sleeve 61 is secured to a gear wheel 68 (see Fig. 8) which meshes with another gear wheel 69, the latter being secured to a pinion 70 which engages a rack 71 connected to a cam slide 72 having a cam roll 73 (see Fig. 1) which engages a cam plate 74 driven continuously from an electric motor or other source of power and carried by the lower part of the finishing machine. Associated with the pinion 70 is a clutch 75 (Fig. 1) arranged so that only movements in one direction of the rack 71 will cause a rotary movement to be imparted to the sleeve 61. The rack 71 is also preferably extended as shown in Figs. 1 and 8 so that through the medium of a pinion 77 and another clutch 78 it serves to give the mould table of the finishing machine its intermittent motion.

The rotatable sleeve 61 has keyed thereto so as to rotate therewith and so that it can slide thereon the framework or neck mould carrier 80 (Fig. 1) which may consist of a casting formed with two hollow arms 81 and 82 substantially 180° apart each having a neck mould mounted on its undersurface. If desired, the carrier may be formed with more than two such arms and neck moulds. The lower end of each arm terminates in a horizontal portion 84 formed with an opening into which fits a flanged ring 85 formed with an upstanding guide 86. Into the ring 85 is fitted an adaptor 88 so that its lower end projects below the lower end of the ring 85 to form a spigot 89 to which is secured a gear wheel 90. The gear wheel 90 is provided with a downwardly extending pivot pin 91 on which the neck mould arms 92 and 93 (which carry the two halves 94 and 95 of the neck mould) are pivoted. The formation of the neck mould arms can be seen more clearly from Fig. 4. The gear wheel 90 also carries a pair of downwardly extending registering pins 96 which serve, in a lower position of the neck mould, to locate the neck mould in position on the extrusion head 6. Each gear wheel 90 also has a pinion 98 arranged so that it is always in mesh therewith, these pinions being secured to the lower ends of a pair of vertical shafts 99 (see Figs. 1 and 4). The neck mould arms 92 and 93 are provided with suitable closing springs 100 and the extrusion head 6, the neck mould 94, 95 and the adaptor 88 are formed with passages 54, 55 and 56 respectively, which in the co-operative position (see Fig. 2) of these parts are adapted to register with one another, the passages 56 being formed so they are in communication with an annular recess 101 in the adaptor for the purpose of enabling at the appropriate times communication with a source of vacuum or with a source of compressed air to be established.

The means for delivering compressed air to the annular recess 101 comprise a pipe 103 (see Fig. 4) one end of which is secured to one side of the lower part of the arm 81 of the neck mould carrier while the other end is in communication with an opening 104 formed in the rotatable sleeve 61 and adapted, at the appropriate time, to be brought into registration with a compressed air pipe 105 arranged inside the vertical column 60. The means for enabling the annular recess 101 to be placed in communication with a source of vacuum comprise the passage 58 formed internally in the arm 81, the upper end of this passage being disposed so that, at the appropriate time, it can be brought into registration with another opening 106 in the rotatable sleeve 61, this opening being adapted to be brought into registration with an opening 109 in the column 60 and the opening 109 being connected with the vacuum pipe 107, which is also arranged within the column 60 as is shown in Fig. 1.

The neck mould carrier in addition to carrying the neck moulds has mounted thereon a plurality of vertically movable plungers, one for each neck mould. For this purpose each of the arms 81 and 82 is formed with a bracket or lug 110 (Fig. 1) in which there is keyed by the key 111 so as to be capable of longitudinal movement therein, a plunger stem 112, the upper part of which is formed with a square thread 113. This thread engages a corresponding thread formed internally in a plunger nut 114, the lower end of which is rotatably mounted in an extension 115 of the bracket 110 and the upper end of which is fitted on the plunger operating squared shaft 116. This squared shaft is suspended from and rotatably mounted in a bracket 118 which is mounted upon an outwardly extending flange 119 formed upon the upper end of the sleeve 61 which is rotatably mounted upon the stationary column 60. The upper end of the squared shaft is also provided with a pinion 120 engaging another pinion 121 and coaxial with the latter is a further pinion 122 which engages a horizontal rack 123 provided on the outer end of the rod 124 which is slidably mounted in an upwardly extending part 125 of the bracket 118. Carried by the inner end of the rod 124 is a cam roll 126 engaging a fixed horizontal cam track 127 mounted upon the upper end of another bracket 128 carried by the upper end of the stationary column 60. The formation of the cam track 127 can be seen more clearly from Fig. 3. The slidable rod 124 is also provided with a spring 129 interposed between a collar 130 on the rod and a convenient part of the bracket 118. By the arrangement above described the radial movements of the cam roll 126 produced by the cam track 127 as the neck mould carrier rotates around the stationary column 60 cause rotary movements to be imparted to the pinion 120 which in turn rotates the plunger nut 114 and produces the up and down movements of the plunger stem 112 on the neck mould carrier.

Supported on the lower end of the plunger stem is a plunger holder 140 and in the lower end of the latter there is slidably mounted by a pin and slot arrangement the plunger tip, 141, a suitable spring 142 being arranged between the inner end of the tip and the bottom of the opening in which it is accommodated. The plunger stem 112 is also formed adjacent its lower end with a collar 144 supporting a sealing cap 145 which is adapted to slide on the plunger stem and in the vertical guide 86 provided on the flanged ring 85 which, as described above, surrounds the adaptor 88. The sealing cap 145, is keyed to the plunger stem so that it can slide thereon and a suitable spring 147 is interposed between the upper end of the sealing cap and a convenient flanged or collar part of the plunger holder. It will be observed from the foregoing description that owing to the interconnections provided by the upstanding guide 86 and the sealing cap 145 with its key on the plunger holder, the rotary movements of the neck mold produced by the gear 90 will be communicated to the sealing cap, plunger holder and plunger tip.

The neck mould carrier in addition to being provided with means for rotating same about the stationary column is also provided with means whereby it can be raised and lowered for bringing the neck moulds into and out of co-operative relation with the extrusion head 6 and the finishing moulds on the mould table of the finishing machine. For this purpose, the casting 80 is formed with a pair of outwardly extending brackets 150 (see Fig. 9) in which are secured a pair of vertical rods 151 which extend downwardly from a horizontal cross rod 152 arranged at the top of the machine so that it carries the weight of the neck mould carrier and its associated apparatus. The cross rod 152 is carried by the upper end of a saddle member 153 which can slide vertically in a bracket or casing 154 mounted on the upper end of the stationary column 60 and the casing 154 has secured to one of its inner faces a pair of toothed racks 155. Meshing with these racks are a pair of pinions 156 (Figs. 1 and 10) which are adapted to co-operate with another pair of toothed racks 157 secured to an opposite inner face of the saddle member 153. The pinions are mounted in a slide 158 so that they are capable of rotary movement about a horizontal axis, the said slide being secured to the upper end of an elongated tube 160 which extends downwardly and coaxially through the hollow stationary column 60. The lower end of the tube 160 bears against the upper end of another rack 161 (Fig. 1) meshing with a sector 162 and the latter meshes with a horizontal rack 163, which is provided at its outer end with a cam roller 164 engaging another of the continuously moving cam trucks provided at the lower part of the finishing machine. In the present instance this cam track indicated at 165 is mounted on the under side of the plate carrying the cam track 74 which serves to rotate the neck mould carrier. By this arrangement the movements of the cam roll 164 are communicated to the tube 160 so that the pinions 156 travel over the fixed racks 157 and impart a multiplied up or down movement to the racks 157 and to the neck mould carrier.

Arranged within the elongated tube 160 is a vertical shaft 170 by means of which rotary movements are imparted to the gear wheels 90 which carry the neck mould arms 92 and 93. This shaft terminates at its upper end in a bevel pinion 171 (see Figs. 1 and 3) meshing with a pair of bevel pinions, 172, 173, secured to the inner ends of a pair of horizontal shafts 174, 175, which are journalled in and project outwardly through the opposite sides of the casing 154 at right angles to the horizontal cross rod 152. Slidably mounted upon the outer end of each of the shafts 174, 175 is a clutch jaw 176 which in its outer position is adapted to engage a corresponding clutch jaw 177 secured to another shaft 178 arranged coaxially with the shafts 174, 175. Each of the shafts 178 carries at its outer end a bevel pinion 179 meshing with another bevel pinion 180 which is secured to the upper end of the vertical shaft 99 the lower end of which carries the pinion 98 meshing with the gear wheel 90 which carries the neck mould arms. The shafts 178 are journalled in extensions of the brackets 118 as may be seen more clearly from Fig. 3. The means for rotating the vertical shaft 170 comprise a pinion 190 secured to the lower end of the shaft (see Figs. 1 and 8) and meshing with another pinion 191 coaxial with which is a further pinion 192 meshing with a toothed rack 193 formed on slide 194, the other end of which is provided with a cam roll 195 engaging a continuously moving cam track 196 arranged under the mould table of the finishing machine.

The operation of the machine is as follows:

As the neck mould carrier 80 rotates around the upper part of the stationary column 60, and approaches a position in which one of the neck moulds is disposed above the extrusion head 6 the fixed cam track 127 causes the cam roll 126 to move outwardly so that through the medium of the pinions 122, 121 and 120 the plunger nut 114 is rotated with the result that the plunger holder 140, the sealing cap 145 and the plunger tip 141 commence to descend. Before the completion of this downward movement the sealing cap 145 is brought into contact with the upper surface of the adaptor 88 carried by the arm of the neck mould carrier, and a collar 200 on the plunger tip is brought into contact with the upper surfaces of the two halves 94, 95 of the neck mould which at this stage is closed. The result is therefore that during the completion of the down stroke the springs 142 and 147 are compressed so as to ensure close contact between the parts above referred to. The plunger tip 141 now occupies a position in which it is embraced by the two halves 94, 95, of the neck mould and as soon as the latter is positioned vertically over the outlet orifice 3 of the furnace, the rotary sleeve 61 and the neck mould carrier 80 are brought to rest. This is brought about by so forming and arranging the cam plate 74 that the rack 71 reaches the end of its operative stroke as a neck mould arrives in a position over the outlet orifice of the furnace, the return stroke of rack being rendered ineffective by the clutch teeth of the clutch 75 sliding over their mating members when driven in the reverse direction. The neck mould carrier and the parts carried thereby now descend towards the extrusion head 6 which, at this stage, is closed under air pressure from the cylinders 12 (Figs. 5 and 6), this downward movement being brought about by the operation of the cam roll 164, rack 163, sector 162, rack 161, elongated tube 160, pinions 156, racks 157, saddle member 153, cross rod 152 and the vertical rods 151. During the initial part of this downward movement the slidable jaw clutch 176 is moved along its shaft 174 so that it engages the corresponding jaw clutch 177 thus placing ready for operation the means for rotating the neck mould about its own axis, the sliding movement of the clutch 176 being produced by a cam roll 197 which is mounted upon a bracket 198 (Fig. 1) extending upwardly from the neck mould carrier 80 and which engages a cam plate 199 depending from the slidable part of the clutch. The downward movement of the neck mould carrier continues until the lower surface of the neck mould abuts against the upper surface of the extrusion head 6 as shown in Fig. 2, suitable registering means being provided in the shape of a spigot on the neck mould and a corresponding recess in the extrusion head.

In order to ensure intimate contact between the neck mould and the extrusion head spring pressure may be applied to these parts at the conclusion of the downward stroke of the rack 161 and for this purpose a spiral spring 206 is arranged inside the lower end of the tube 160 and between this tube and another tube 207. The lower end of the tube 207 is screwed into the rack 161 and its upper end is provided with a collar 208 between which and an abutment 209 on the tube 160 the spring 206 is arranged. The parts are adjusted so that the neck mould contacts with the extrusion head just before the end of the downward stroke of the rack 161 with the result that the final part of the stroke causes the collar 208 to compress the spring 206, the resultant spring pressure being transmitted by the abutment 209 and the tube 160 to the neck mould carrier.

It will be appreciated therefore that in the position of the parts illustrated in Fig. 2 the sealing cap 145 is held in contact with the adaptor 88 by the pressure of the spring 147, the plunger tip 141 is held in position in the neck mould parts 94, 95 by the spring 142 and the neck mould held in contact with the extrusion head 6 by the spring 206.

The action of lowering the neck mould carrier 80 on the rotary sleeve 61 also brings the passage 58 in the arm 81 opposite the opening 106 which is in communication with the vacuum pipe 107 and at this juncture a valve 210 which is arranged in the vacuum pipe is timed to open. At this stage the molten glass is slowly rising through the extrusion head 6 owing to the head of glass in the furnace and the application of the vacuum assists the upward movement of the glass so that it rapidly flows into the neck mould and surrounds the plunger tip 141. It may here be mentioned that communication between the passage 58 and the extrusion head orifice may be facilitated by forming grooves 211 or the like in the under surface of sealing cap 145 so that they establish communication between the passages 56 and the space 212 between the plunger holder 140 and the adapter 88 and by forming one or more grooves 214 in the upper surfaces of the neck mould parts 94, 95, the clearance between the cylindrical part of the plunger tip and the opening 215 in the neck mould usually being sufficient to ensure communication between the grooves 214 and the extrusion head orifice. The neck mould carrier by a further actuation of the cam roll 164 is now raised away from the extrusion head at a speed corresponding with that at which the molten glass issues from the orifice in the forehearth and as the upper part of the gob (now somewhat cooled) is supported in the neck mould all skin tension is eliminated and a gob is extruded of uniform diameter (see Figs. 6 and 7). When the required length of gob has been produced the extrusion head 6 is opened through its control valve admitting compressed air to the cylinders 12, the operation of the control valve preferably being timed from the finishing machine. As the parts 7 and 8 of the extrusion head separate, the rack 25 and the pin 26 (Fig. 5) move forwardly until the extensions 32 on the arms 27 are brought into contact with the cam pins 31. The continued movement of the piston 11 then causes the spring 33 to be compressed and the gas jets 40 to be swung into the position shown in Figs. 5 and 7 in which they are in close proximity with the lower end of the extruded gob. Also as the arms 27 move forwardly the cock levers 42 strike the cam pins 31 and open the gas cocks 41. Owing to the close proximity of the gas orifices with the molten glass the gas issuing from the jets is ignited and the flames directed at the lower end of the column of glass where it is to be parted.

Simultaneously the neck mould carrier 80 commences (owing to the formation of the cam 165) to rise more rapidly and the neck mould 94, 95, the sealing cap 145 and the plunger tip 141 are rotated about their vertical axes by the gear wheel 90 which is actuated from the cam track 196 through the medium of the cam roll 195, slide 194, toothed rack 193, pinions 192, 191, 190, vertical shaft 170, bevel gears 171, 172, horizontal shaft 174, clutch jaws 176, 177, bevel gears 179, 180, vertical shaft 99 and the pinion 98; the clutch jaws 176, 177 having, as stated above, been brought into engagement with one another during the early part of the descent of the neck mould carrier by the operation of the cam roll 197. This rotary movement of the neck mould completes the severing or parting of the gob or column of glass from the body of molten glass in the outlet orifice of the forehearth. While the neck mould carrier is in the last stage of its upward movement and the neck mould is rotating the cam roll 197 holds the slidable clutch jaws 176 positively in engagement with its mating jaw 177 by rolling up a projection on the cam plate 199. The cam roll 197 then meets an opposite projection on the cam plate with the result that clutch jaw 176 is then thrown out of mesh with the jaw 177 and the neck moulds cease to rotate. By this time the neck mould carrier 80 has again reached its upper position on the rotary sleeve 61 and the latter and the neck mould carrier are then rotated through 180° around the stationary column 60 by the cam roll 73, slide 72, rack 71, pinion 70, the gear wheels 69 and 68 in order to carry the hanging gob to the finishing mould.

Immediately the hanging gob is elevated sufficiently to clear the top of the extrusion head 6 the control valve 15 again admits compressed air to the cylinders 12 so as to move the pistons 11 in the opposite direction in order to close the extrusion head ready for the extrusion of the next gob. Also as the two parts of the extrusion head approach one another the gas nozzles 40 are swung away by the spring 36 and gas jets extinguished.

In order to prevent any considerable stretching or deformation of the hanging gob during its 180° movement around the column 60 a baffle plate or support for the lower end of the gob may be provided. For instance, there may be secured to the lower end of the rotary sleeve 61 a pair of brackets 220 in each of which is slidably mounted a toothed rack 221 (Figs. 1 and 4) carrying at its inner end a cam roll 222 engaging a stationary cam 223 which is supported from the fixed column 60. Meshing with the rack 221 is a pinion 224 which is journalled on the bracket 220 and is keyed to a vertical spindle 225 to which is secured an arm carrying a baffle plate 226 arranged to swing about the pinion axis as the pinion rotates. The cam 223 is shaped so that, as soon as the rotary sleeve 61 commences its 180° movement, the baffle plate 226 disposed adjacent the neck mould which is moving away from the orifice 3 is swung by the pinion 224 into position under the hanging gob of glass and thus chills and flattens the bottom portion of the gob as it tends to elongate or stretch due to its partial fluidity.

Also during the passage of the hanging gob from its position over the furnace orifice to a position over a finishing mould a "chill" puff of compressed air may be administered to that portion of the gob which is embraced by the two halves of the neck mould. This may be brought about by forming the stationary cam 127 at the upper part of the machine so that, through the parts actuated by the cam, the plunger tip is lifted slightly, for instance, about 1½ inches, to allow the admittance of compressed air into the blow hole in the gob formed by the plunger tip during the feeding process. As the plunger holder 140 is a sliding fit in the sealing cap 145, it will be seen that this preliminary rise of the plunger tip will not affect the close contact of the sealing cap with the adoptor 88 maintained by the spring 147. Immediately after the plunger tip receives this preliminary upward movement the opening 104 in the rotary sleeve 61 arrives opposite the compressed air pipe 105 and the "chill" puff is administered, after which the cam 127, through its cam roll 126, slide 124 and plunger nut 114, gives the plunger tip its final upward movement, with the result that the shoulder 144 on the plunger holder 140 is brought into contact with the sealing cap 145 and the latter lifted away from the adaptor 88 to a predetermined height.

Just before the rotary sleeve 61 completes its 180° movement the baffle plate 226 is moved out of contact with the lower end of the suspended gob. This may be brought about by providing another fixed cam plate 228 adjacent the cam 223 and by securing the lower end of the spindle 225 to a bracket 229 carrying a cam roll 230 arranged so that it can co-operate with the cam plate 228 and rotate about a horizontal axis. The cam plate 228 is formed so that, at the appropriate moment, the cam roll 230, the spindle 225 and the baffle plate 226 are given a slight downward movement sufficient to clear the baffle plate from the lower end of the gob, after which the cam roll 222 is brought into operation again so that through the rack 221 and the pinion 224 the baffle plate is then swung from its position under the gob. The rotary sleeve 61 and the neck mould carrier which is carried thereby are now brought to rest, the cam plate 228 being formed so that the cam roll 230 and the baffle plate 226 are raised again during the return movement of the neck mould from the finishing mould to the orifice 3.

The neck mold carrier 80 is then lowered on the sleeve 61 by the operation of the cam 165 until the gob is at a level suitable for enabling it to be transferred to one of the finishing moulds which are carried by the mould table 50 rotating in unison with the neck mould carrier by the cam 74 through the medium of the slide 71. During this downward movement of the neck mould carrier the neck mould carried by the opposite arm of the carrier is brought into contact with the extrusion head 6 ready for receiving the succeeding gob, the plunger tip 141, and sealing cap 145 having been lowered into co-operative relation with such neck mould during the approach towards the orifice 3 as described above. The two parts of one of the blow moulds are then closed around the gob by any of the well known methods and are registered on the same dividing line as the extrusion head by the two registering pins 96 against which the two halves of the blow mould close. The release of the suspended gob is effected by opening the neck mould arms 92 by suitable means which may comprise a pair of pins 240 (Fig. 4) arranged in such a position that, during the final stage of the lowering of the neck mould carrier, the outer ends of the neck mould arms 92, 93, are brought to rest with their opposed faces disposed on opposite sides of such pins as depicted in the lower half of Fig. 4. The pins 240 are carried at the outer ends of a pair of pivotally mounted actuating arms 241 which, by cam rolls 242 operated by suitable means, can be moved about their pivots in opposition to the closing springs 100 until they occupy a position indicated by the upper half of Fig. 4. During this time another gob has been extruded into the neck mould which is disposed over the orifice 3 and at this juncture the neck mould carrier is again raised, the neck mould opening pins 240 being closed as soon as the neck mould has reached a height consistent with clearing the top of the gob. The final stage in the production of the bottle may be performed by placing, in any well known manner, a blow head over the blow mould and causing compressed air to enter the cavity in the upper end of the gob and to blow the gob to the shape of the mould, the bottle being afterwards carried in intermittent stages to the opposite side of the mould table and delivered.

It will be observed that the length of gob extruded can be varied by adjusting the jack screws 63 and that variations in the length of stroke of the neck mould carrier or in the timing of its rotary movements can be effected by changing the cams 165 and 196 or by the introduction of suitable movement modifying mechanism between the cams and the units which are adapted to be operated thereby. Various other modifications in the construction and mode of operation will be apparent to those skilled in the art.

Having thus described my invention, what I claim as new therein, and desire to secure by Letters Patent, is:—

1. A method of feeding glass to a glass moulding apparatus, which comprises passing the glass upwardly out of the outlet orifice of a glass furnace, through an extrusion head and into a neck mould positioned on the upper end of the extrusion head, and then lifting the neck mould upwardly away from the extrusion head so that a column of glass of constantly increasing length is produced, said column when it is of predetermined length being detached and shaped in a suitable moulding apparatus.

2. A method of feeding glass to a glass blowing or moulding apparatus, which comprises passing the glass upwardly out of an outlet orifice of a glass furnace disposed below the level of the glass in the furnace and into a neck mould positioned over the orifice under the combined influence of the head of glass in the furnace and a reduced atmospheric pressure applied to the neck mould, and then lifting the neck mould upwardly away from the orifice so that a column of glass of constantly increasing length is produced, said column when it is of predetermined length being detached and shaped in a suitable moulding apparatus.

3. A method of feeding glass to a glass blowing or moulding apparatus, which comprises passing the glass upwardly out of an outlet orifice of a glass furnace so that a column of glass of constantly increasing length is produced, necking-in the glass in the vicinity of the outlet, and detaching the column from the body of glass at the furnace orifice by imparting to the column a combined rotary and upward movement.

4. A method of feeding glass to a glass moulding apparatus, which comprises extruding the glass in an upward direction through an outlet orifice of a glass furnace and into a neck mould positioned over the said orifice, the said neck mould being then raised at a speed corresponding with that at which the glass is extruded until a column of glass of the required length is produced and the said column being then detached and shaped in a suitable moulding apparatus.

5. A method of feeding glass to a glass moulding apparatus, which comprises extruding the glass in an upward direction through an outlet orifice of a glass furnace disposed below the level of the glass in the furnace, the exuded glass being caused to flow into a neck mould positioned over the orifice, and the neck mould being raised at a speed corresponding with that at which the glass is extruded until a column of glass of the required length is produced, the said column being then detached and transferred to a glass blowing or moulding apparatus.

6. A method of feeding glass to a glass moulding apparatus, which comprises passing the glass upwardly out of the outlet orifice of a glass furnace disposed below the level of the glass in the furnace, through an extrusion head and into a neck mould positioned on the upper end of the extrusion head under the combined influence of the head of glass in the furnace and a reduced atmospheric pressure applied to the neck mould, and then lifting the neck mould upwardly away from the extrusion head so that a column of glass of constantly increasing length is produced, said column when it is of a predetermined length being detached and shaped in a suitable moulding apparatus.

7. A method of feeding glass to a glass blowing or moulding apparatus, which comprises passing the glass upwardly out of an outlet orifice of a glass furnace so that a column of glass of constantly increasing length is produced, and necking-in the glass in the vicinity of the outlet by applying one or more jets of inflammable gas to the lower end of the column.

8. A method of feeding glass to a glass blowing or moulding apparatus, which comprises passing the glass upwardly out of an outlet orifice of a glass furnace and into a neck mould positioned over the orifice, lifting the neck mould upwardly away from the orifice so that a column of glass of constantly increasing length is produced, necking-in the glass in the vicinity of the outlet by applying one or more jets of inflammable gas to the lower end of the column, and then detaching and shaping the column of glass disposed above the neck.

9. A method of feeding glass to a glass blowing or moulding apparatus, which comprises passing the glass upwardly out of an outlet orifice of a glass furnace so that a column of glass of constantly increasing length is produced, detaching the column from the body of glass at the furnace orifice by imparting to the column a combined rotary and upward movement, and then shaping the column in a mould.

10. A method of feeding glass blowing or moulding apparatus, which comprises extruding the glass in an upward direction through an outlet orifice of a glass furnace disposed below the level of glass in the furnace, positioning a neck mould over the said orifice and raising it at a speed corresponding with that at which the glass is extruded until a column of the required length is produced, producing a restriction of the glass in the vicinity of the outlet, detaching the extruded column by imparting thereto a combined rotary and upward movement, and then shaping the column in a mould.

11. A method of feeding glass to a glass moulding apparatus, which comprises passing the glass upwardly out of an outlet orifice of a glass furnace disposed below the level of the glass in the furnace, through an extrusion head and into a neck mould positioned on the upper end of the extrusion head, lifting the neck mould upwardly away from the orifice so that a column of glass of constantly increasing length is produced, opening the extrusion head, and necking-in the glass in the vicinity of the outlet by applying one or more jets of inflammable gas to the lower end of the column.

12. A method of feeding glass to a glass moulding apparatus, which comprises passing the glass upwardly out of the outlet orifice of a glass furnace disposed below the level of the glass in the furnace, through an extrusion head and into a neck mould positioned on the upper end of the extrusion head under the combined influence of the head of glass in the furnace and a reduced atmospheric pressure applied to the neck mould, lifting the neck mould upwardly away from the extrusion head so that a column of glass of constantly increasing length is produced, necking-in the glass in the vicinity of the outlet, and then detaching and shaping the column of glass disposed above the neck.

13. A method of feeding glass to a glass moulding apparatus, which comprises passing the glass upwardly out of an outlet orifice of a glass furnace disposed below the level of the glass in the furnace, through an extrusion head and into a neck mould positioned on the upper end of the extrusion head, lifting the neck mould upwardly away from the extrusion head so that a column of glass of constantly increasing length is produced, and detaching the column from the body of glass at the furnace orifice by imparting to the column a combined rotary and upward movement.

14. A method of feeding glass to a glass moulding apparatus, which comprises passing the glass upwardly out of an outlet orifice of a glass furnace disposed below the level of the glass in the furnace, through an extrusion head and into a neck mould positioned on the upper end of the extrusion head, lifting the neck mould upwardly away from the extrusion head so that a column of glass of constantly increasing length is produced, opening the extrusion head, necking-in the glass in the vicinity of the outlet, and detaching the column from the body of glass at the furnace orifice by imparting a combined rotary and upward movement to the neck mould.

15. Apparatus for feeding glass to a glass blowing or moulding machine, comprising a glass furnace having an upwardly directed outlet orifice disposed below the level of the glass in the furnace, an extrusion head mounted on the outlet orifice, a neck mould, means for moving the neck mould into and out of registration with the extrusion head, and means for imparting a combined rotary and upward movement to the neck mould.

16. Apparatus for feeding glass to a glass blowing or moulding machine, comprising a glass furnace having an upwardly directed outlet orifice disposed below the level of the glass in the furnace, an extrusion head mounted on the outlet orifice, a neck mould, means for moving the neck mould towards and away from the said extrusion head, means for opening and closing the extrusion head, and means for moving one or more gas jets into close proximity with the outlet orifice during an opening movement of the extrusion head.

17. Apparatus for feeding glass to a glass blowing or moulding machine, comprising a glass furnace having an upwardly directed outlet orifice disposed below the level of the glass in the furnace, a neck mould, means for moving the neck mould toward and away from the orifice, and means for imparting a combined rotary and upward movement to the neck mould, said neck mould consisting of two parts carried by a pair of arms pivotally mounted upon the underside of a rotary member.

18. The combination of a glass furnace having an upwardly directed outlet orifice disposed below the level of the glass in the furnace, a moulding machine stationed a short distance from the orifice, a neck mould, a neck mould carrier, means for raising and lowering the carrier so as to move the neck mould towards and away from the said orifice, and means for rotating the neck mould carrier about a vertical axis disposed between the moulding machine and the orifice.

19. The combination of a glass furnace having an upwardly directed outlet orifice disposed below the level of the glass in the furnace, an extrusion head mounted on the outlet orifice, a moulding machine stationed a short distance from the orifice, a stationary column disposed between the moulding machine and the orifice, a neck mould carrier rotatably mounted on said column, said neck mould carrier being formed with an outwardly extending hollow arm, a neck mould mounted upon the lower end of said arm, openings in the said column, and means for rotating the neck mould carrier so that communication can be established between the neck mould and the interior of the column.

20. The combination of a glass furnace having an upwardly directed outlet orifice disposed below the level of the glass in the furnace, a moulding machine stationed a short distance from the outlet orifice, a neck mould carrier rotatable about a vertical axis disposed between the orifice and the moulding machine, means for rotating the neck mould carrier about said axis, means for raising and lowering the neck mould carrier, a neck mould mounted upon the neck mould carrier, and means for rotating the neck mould about an axis parallel with the axis of rotation of the neck mould carrier.

THOMAS COURTNEY MOORSHEAD.